United States Patent [19]

Pfeiffer

[11] Patent Number: 4,664,139

[45] Date of Patent: May 12, 1987

[54] VALVE ESPECIALLY FOR CONTROLLING PARTICULATE SOLIDS FLOW

[76] Inventor: Robert W. Pfeiffer, 3 Hidden Spring La., Rye, N.Y. 10580

[21] Appl. No.: 570,171

[22] Filed: Jan. 12, 1984

[51] Int. Cl.[4] .......................... F16K 3/26; F16K 3/32
[52] U.S. Cl. .................... 137/240; 251/205; 251/120; 251/326; 251/368; 137/375; 406/192; 222/561; 222/216
[58] Field of Search ................. 251/205, 326, 327, 63, 251/120, 368; 137/240, 375; 406/192, 195, 183; 222/561, 559, 216

[56] References Cited

U.S. PATENT DOCUMENTS

| | | | |
|---|---|---|---|
| 1,090,807 | 3/1914 | Warthen | 251/63 X |
| 1,550,725 | 8/1925 | Jung | 251/205 X |
| 1,770,717 | 7/1930 | Stremberger | 251/205 X |
| 1,892,260 | 12/1932 | Wick | 251/326 X |
| 2,059,733 | 11/1936 | Heisser | 137/240 |
| 2,903,564 | 9/1959 | Carr | 251/368 X |
| 3,240,466 | 3/1966 | Meyer | 251/205 X |
| 3,918,471 | 11/1975 | Bedner | 251/326 X |
| 4,257,543 | 3/1981 | Muschner et al. | 222/561 X |

FOREIGN PATENT DOCUMENTS 1918875 11/1969 Fed. Rep. of Germany ...... 251/326

*Primary Examiner*—Arnold Rosenthal
*Attorney, Agent, or Firm*—Victor E. Libert

[57] ABSTRACT

An improved valve well-suited for controlling the flow of particulate solids comprises a valve body having a flow passageway comprising inlet and outlet passages extending transversely to a slide chamber. A plug member having a flow orifice, which is preferably of extended length extending transversely through it is mounted for sliding movement within the slide chamber to seal the flow passageway when the flow orifice is out of register therewith and to connect the inlet and outlet passages in flow communication when registered therewith. The flow orifice is preferably of ovoid cross-section and provides, at all operating positions of the valve, a cross-sectional flow area from the flow orifice to the outlet passage which is at least as great as the smallest cross-sectional flow area of the flow orifice. The flow orifice in its wide open position does not restrict the cross-sectional area available for flow between the inlet and outlet passages of the valve body.

20 Claims, 18 Drawing Figures

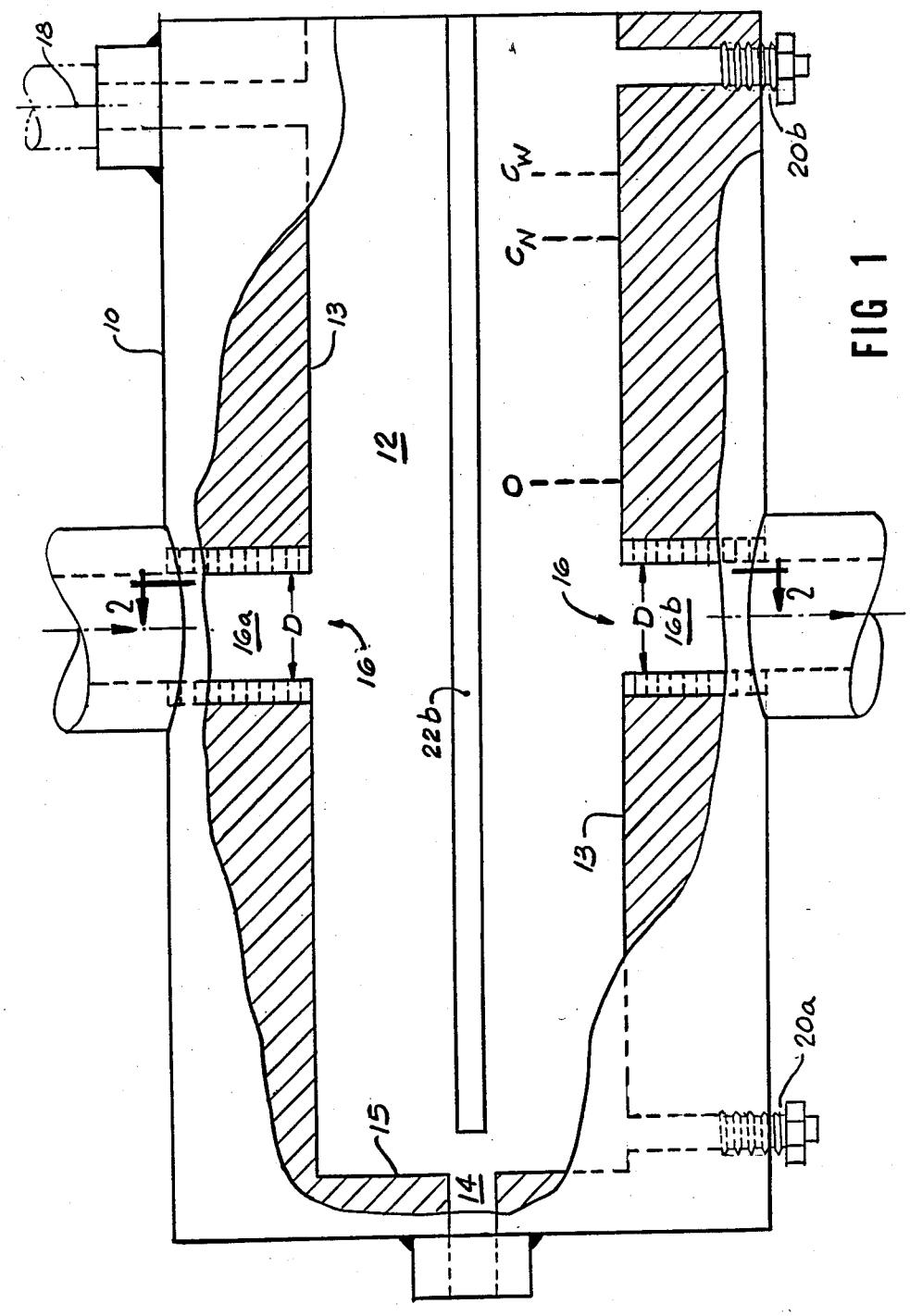

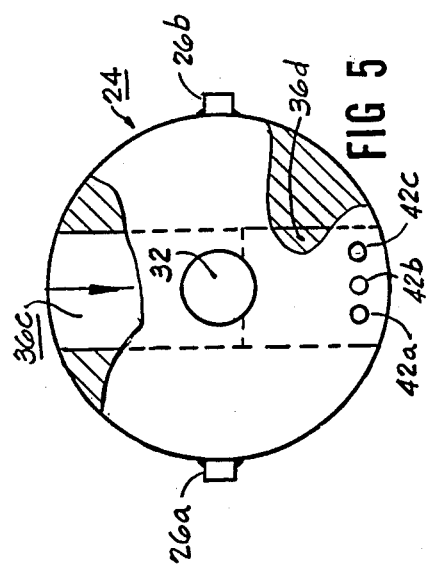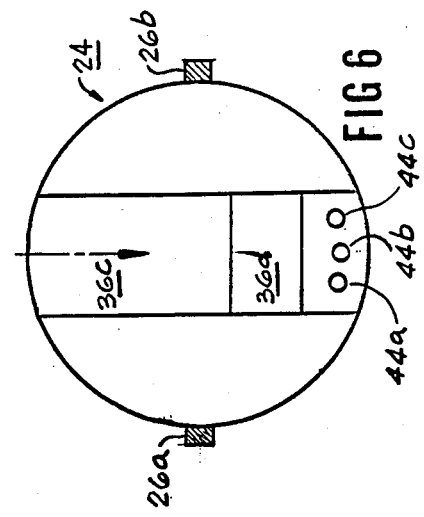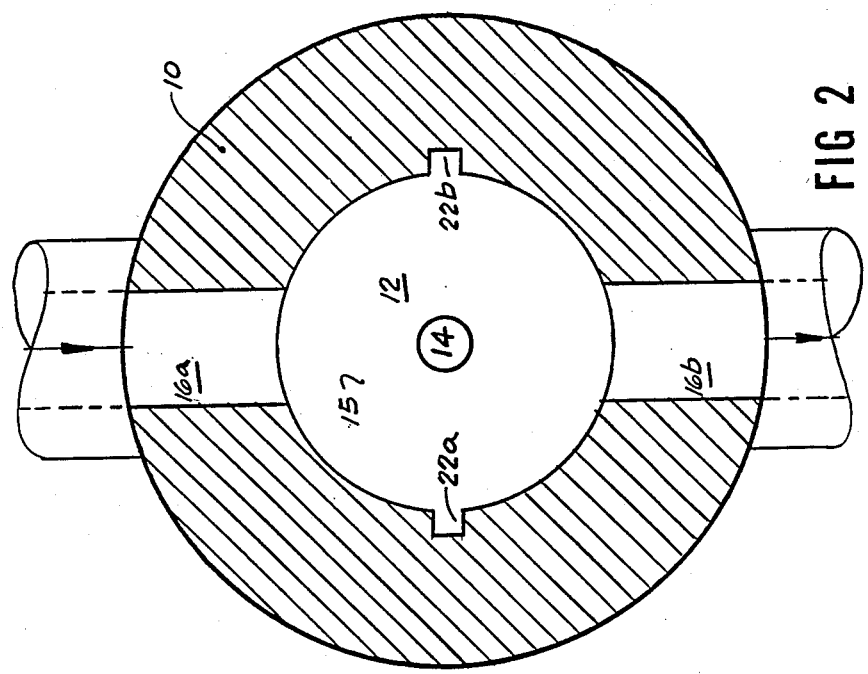

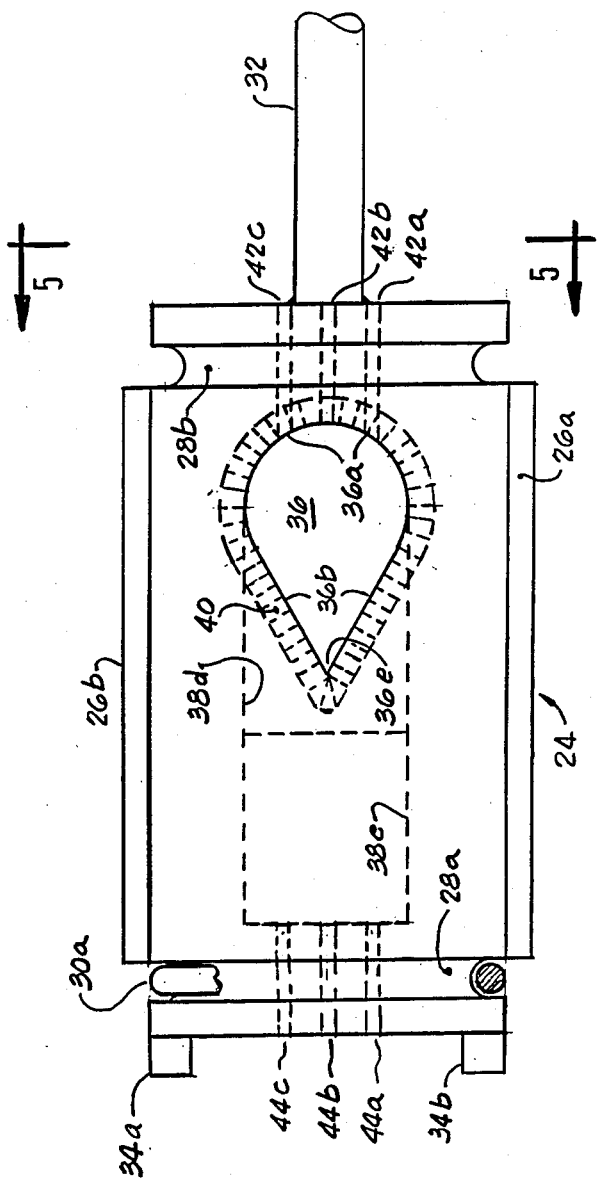

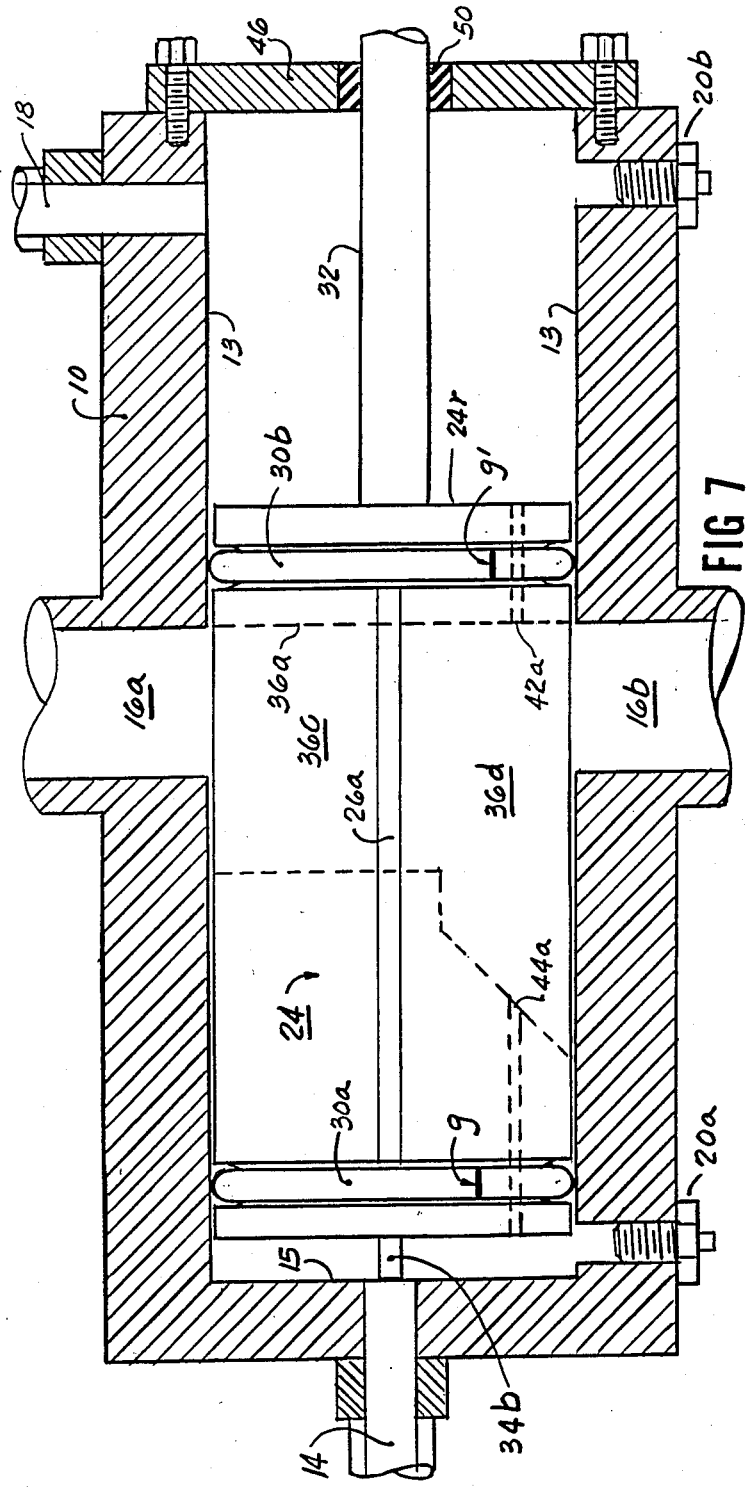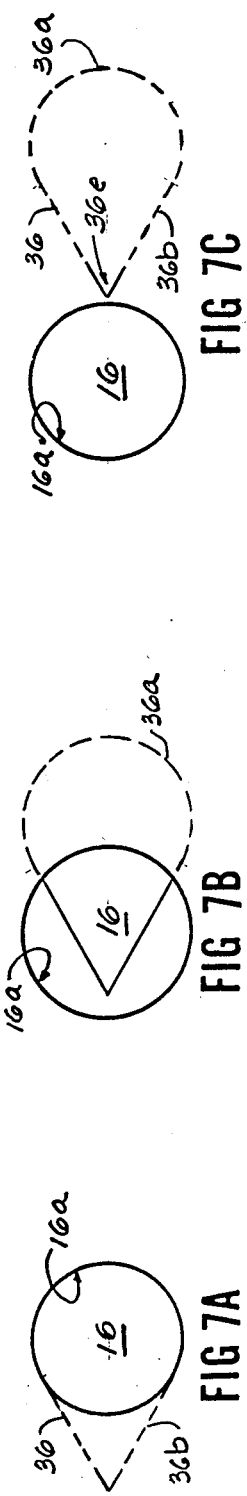

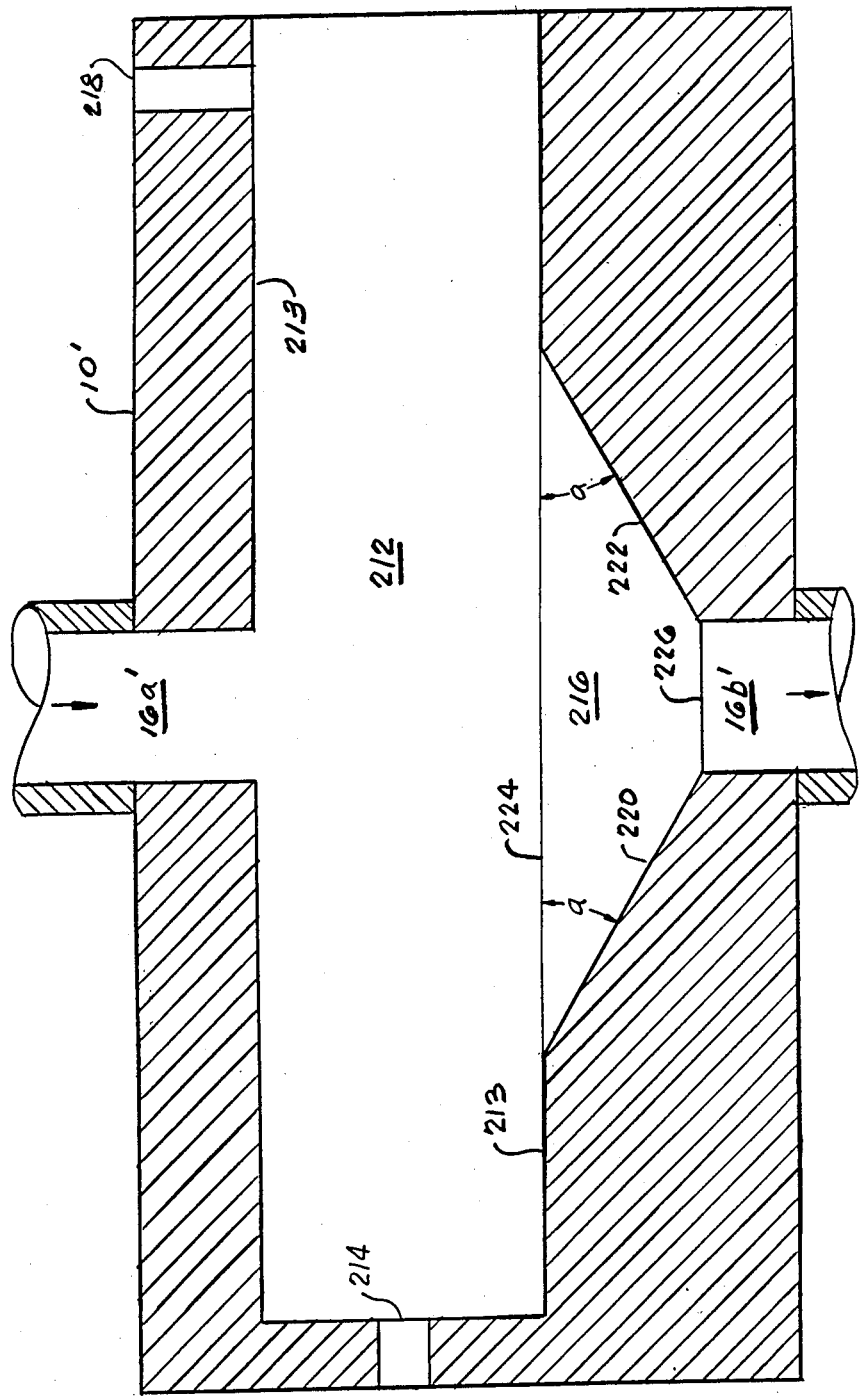

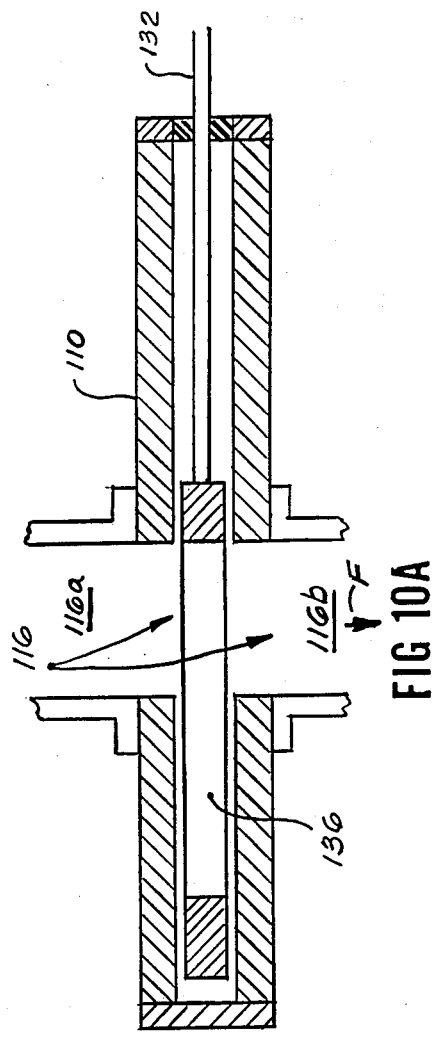
FIG 10A
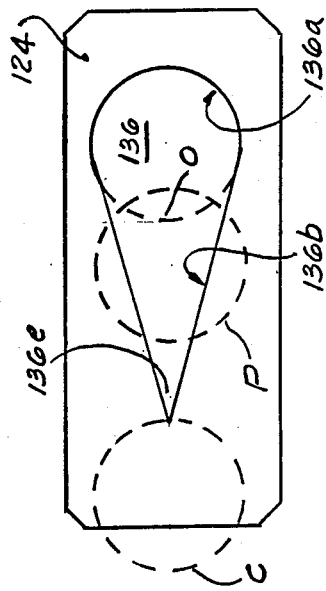
FIG 10B
FIG 10C

VALVE ESPECIALLY FOR CONTROLLING PARTICULATE SOLIDS FLOW

BACKGROUND OF THE INVENTION

The present invention pertains to an improved valve and more particularly pertains to a wear-resistant valve particularly well adapted to the valving of dry solid particulate materials having high flowing densities such as, for example, fluidized solids such as the fluidized catalysts flowed through dense-phase standpipes utilized in fluid catalytic cracking units. The valve of the invention is also well suited to the valving of slurries of coal or other abrasive particulate solids. Because of the abrasive nature of such particulate materials and the fact that such valves are often required in high temperature, high pressure-drop services, wear of the component parts of the valve is a severe problem requiring frequent replacement or repair. Such wear can be particularly severe if the valve is so small that it is not feasible to apply abrasion-resistant surfaces at key wear points.

The prior art discloses valve structures specifically designed for handling fluidized or other solid particulates and shows an awareness of the problems of wear of the component parts of such valves.

Worley et al U.S. pat. No. 4,253,487 discloses a slide valve for use in throttling solids flow comprising a pair of opposed discs that are mounted to slide within a valve body and which are retained by guide bars such that the discs' movement is limited to a back and forth movement. It further discloses (col. 7) that the desired erosion protection of the valve internals is achieved by providing hard-surfacing material such as Stellite, a wear-resistant alloy. The configuration of the disclosed valve is given in detail at lines 30–65 of col. 4.

Efferson U.S. Pat. No. 4,372,338 describes in col. 1 the use of pressure equalization and purge lines in the design of the plug valve to keep the valve free of fine solids thereby reducing its wear. This patent shows a rotary plug valve having pockets 27 which rotate to transport slurry from a low pressure to a high pressure line by indexing the pockets alternately with low and high pressure openings.

Bhide U.S. Pat. No. 4,292,992 discloses a slide gate valve having an inflatable seal element and shows the use of a purge gas arrangement to blast solid particles from the gate surfaces where these make contact with the inflatable seal.

Usnick et al U.S. Pat. No. 4,174,728 discloses a gate valve in which the sealing surfaces of the slidable gate are shielded by the valve seats, and an inflowing purge gas is utilized to sweep the gate clear of particles.

Bailey U.S. Pat. No. 4,009,727 discloses a knife-gate type valve including a cylindrical shaped valve liner which is replaceable and preferably is made of a material such as polyurethane.

Worley et al U.S. Pat. No. 3,701,359 discloses a slide valve which is internally insulated to maintain a lower temperature at the metal body of the valve.

Hoopes U.S. Pat. No. 2,631,759 discloses a slide valve having perforations formed on the inner surfaces of the components of the valve to admit a cushion of air or gas therein to reduce erosion of the valve by solid particulates.

French Pat. No. 2388/183 (ABG-Semca) discloses a valve having a valve head mounted on a C-shaped bar which is affixed to a crankshaft which causes the C-shaped bar to rotate the valve head between open and closed positions.

SUMMARY OF THE INVENTION

In accordance with the present invention, there is provided an improved valve, as follows. A valve body has a slide chamber therein and an inlet passage and an outlet passage cooperating to partially define a flow passageway transversely intersecting the slide chamber. A plug member is mounted for sliding movement within the slide chamber and has a flow orifice extending transversely therethrough, the plug member and its flow orifice being each dimensioned and configured to seal the flow passageway when the flow orifice is out of registration with the inlet passage and to complete the flow passageway by connecting the inlet and outlet passages in flow communication when the flow orifice is registered therewith. The flow orifice and the outlet passage are each dimensioned and configured so that, at all operating positions of the plug member within the slide chamber, the cross-sectional area available for flow from the flow orifice into the outlet passage is at least as great as the smallest cross-sectional area for flow within the flow orifice itself. Positioning means are operatively connected to the plug member to position the plug member at selected locations within the slide chamber to selectively adjust registration of the flow orifice with the flow passageway.

In another aspect of the invention, the inlet and outlet passages are respectively located at radially spaced-apart, preferably radially opposite, sides of the slide chamber. Generally, the flow orifice, particularly the outlet segment thereof, and the outlet passage are each dimensioned and configured so that, at all operating positions of the plug member within the slide chamber, the cross-sectional area available for flow from the outlet segment to the outlet passage is as great as, or greater than, that of the minimum cross-sectional area for flow within the flow orifice, particularly through the inlet segment thereof. All "operating positions" of the plug member means at least all positions in which the valve is fully or partially open for flow therethrough.

In one aspect of the invention, the flow orifice comprises an inlet segment facing the inlet passage of the flow passageway, and an outlet segment facing the outlet passage of the flow passageway and the cross-sectional area of the outlet segment is equal to or greater than the minimum cross-sectional area of the inlet segment.

In another aspect of the invention, the length of the flow path through the flow orifice is larger than the diameter of the inlet passage.

In another aspect of the invention, the length of the flow path through the flow orifice inlet segment is at least about one-fifth, preferably at least about one-third, of the diameter of the inlet passage.

The present invention also provides for one or more of the following features, in any suitable combination: the cross-sectional area of the flow-orifice inlet segment may be at least as large as the cross-sectional area of the flow passageway; the inlet and outlet passages of the flow passageway may be of equal cross-sectional area and/or may be of circular cross-section, and the flow orifice may be of ovoid cross-section; the base portion of the ovoid cross-section of the flow orifice may have a cross-sectional flow area at least as large as that of the inlet passage and the tapered slot portion of the ovoid cross-section may have a cross-sectional flow area less than that of the inlet passage. In one aspect of the invention, the base portion of the ovoid cross-section of the flow orifice may comprise an arc of a circle of a diameter as least as great as the diameter of the inlet passage and the tapered slot portion of the ovoid cross-section is narrower than the diameter of the inlet passage whereby, when the base portion of the ovoid flow passageway is fully registered with the inlet passage, the valve is fully open to flow therethrough and, when the slot portion or part thereof is registered with the inlet segment, the valve is partially open for flow therethrough. In another aspect of the invention, the base portion of the ovoid cross-section of the flow orifice is dimensioned and configured to be congruent with an arc of the cross-section of the inlet passage.

In preferred configurations, the cross-sectional flow area through the flow orifice of the plug is as large or larger than the cross-sectional flow area of the inlet and outlet passages so that at the "fully open" position, the plug member does not not reduce flow through the valve.

One or more of the following features in any suitable combination is also provided by the present invention: at least the portion of the flow path orifice adjacent the inlet passage may comprise a wear-resistant material; the slide chamber preferably comprises a substantially cylindrical shaped bore and the plug member is preferably of generally cylindrical configuration; purge fluid means may be provided to flow a purge gas or purge liquid through the annular clearance between the plug member and the slide chamber; the purge fluid means may comprise purge fluid, i.e., purge gas, inlet means in the valve body, the plug member may have a pair of axially spaced-apart annular seal members, and the purge gas inlet means may be disposed so as to be axially outward of the annular seal members regardless of the position of the plug member within the slide chamber; fluidizing gas flow means to flow a gas through the outlet segment of the flow orifice may be provided; the fluidizing gas flow means may comprise fluidizing gas inlet passages respectively extending from opposite ends of the plug member to the outlet segment of the flow orifice; and the fluidizing gas flow inlet passages may be arranged to flow the fluidizing gas across the outlet segment of the flow orifice.

In another aspect of the invention, the end of the outlet passage adjacent the slide chamber is of enlarged cross-section to define an enlarged entry of the outlet passage at the slide chamber. The enlarged entry preferably comprises a wedge-shaped entry defined by opposing sloped sidewalls (which preferably define an angle of up to about 60° with the slide chamber wall), a wide longitudinal opening into the slide chamber, and a narrow throat.

In accordance with another aspect of the invention, there is provided an improved valve comprising a valve body having a slide chamber therein and an inlet passage and an outlet passage cooperating to partially define a flow passageway extending transversely through the slide chamber. A plug member is mounted for sliding movement within the slide chamber and has a flow orifice extending transversely therethrough, the plug member and its flow orifice being each dimensioned and configured to seal the flow passageway when the flow orifice is out of registration with the inlet passage and to complete the flow passageway by connecting the inlet and outlet passages in flow communication when the flow orifice is registered therewith. The flow orifice is of ovoid cross-section and the inlet and outlet passages of the flow passageway are of circular cross-section, the ovoid cross-section of the flow orifice having a circular-arc base portion which is congruent with a segment of the cross-section of the flow passageway and a tapered slot portion which is narrower than the diameter of the inlet passage whereby, when the base portion is fully registered with the flow passageway, the valve is fully open to flow therethrough and, when the slot portion or part thereof is registered with the flow passageway, the valve is partially open to flow therethrough.

In another aspect of the invention, the plug member is a plate-like member and the flow orifice extends through the major surfaces thereof. Preferably, the base portion of the ovoid flow orifice is congruent with a section of the inlet passage whereby, when the base portion is fully registered with the inlet passage, the valve is fully open to flow therethrough and, when the slot portion or part thereof is registered with the inlet passage, the valve is partially open for flow therethrough.

BRIEF DESCRIPTION OF THE DRAWINGS

FIG. 1 is a view in side elevation of the valve body of one embodiment of the present invention, with portions broken away for clarity of illustration;

FIG. 2 is a section view taken along line 2—2 of FIG. 1;

FIG. 3 is a plan view of a plug member adapted to be slidably mounted within the valve body of FIG. 1;

FIG. 5 is an end view along line 5—5 of FIG. 3;

FIG. 6 is a section view along line 6—6 of FIG. 4;

FIG. 7 is an assembly view in side elevation, with the valve body shown in section view for clarity of illutration, of the valve of FIGS. 1-6 showing the plug in wide-open operating position for solids flow;

FIGS. 7A-7C are schematic plan views showing the relative positions of the flow passageway of the valve body and the flow orifice of the plug member during operation of the valve;

FIG. 9 is a view in side elevation of the valve body of an embodiment of the invention having an outlet passage with an enlarged entry end;

FIG. 10A is a cross-sectional schematic view in elevation of another embodiment of the invention utilizing a plate-like plug member;

FIG. 10B is a plan view of the plate-like plug member of the FIG. 10A embodiment; and FIG. 10C is a side elevation view of the plug member of FIG. 10B.

DETAILED DESCRIPTION OF THE PREFERRED EMBODIMENTS

Figure 4:
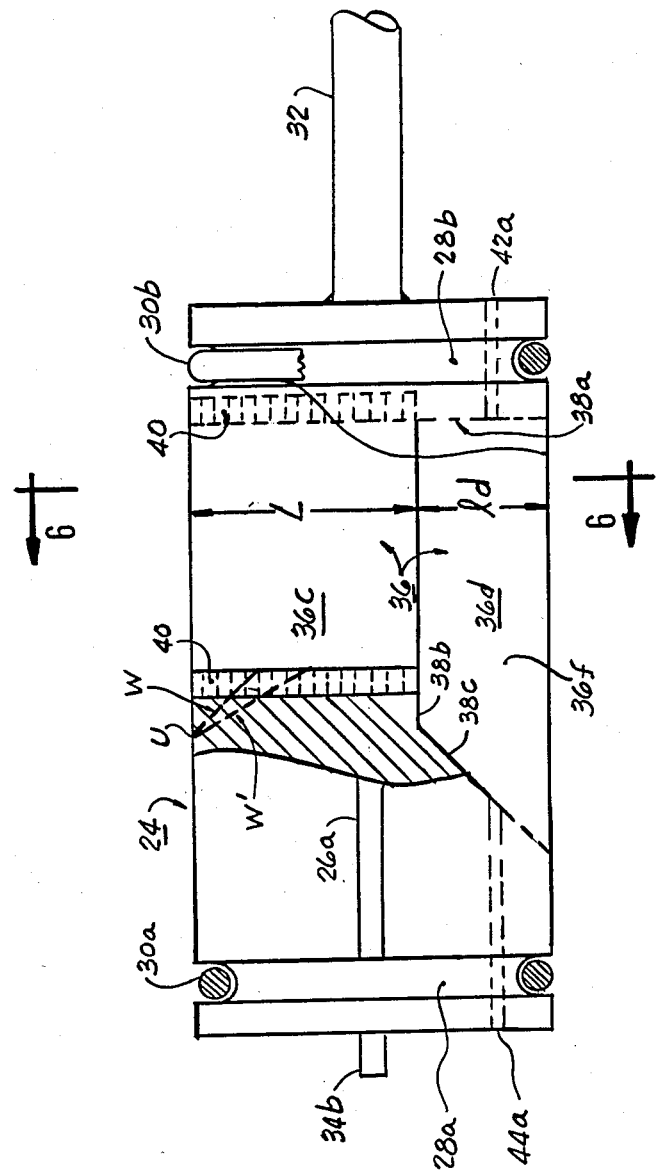
FIG. 4 is a side elevation view of the plug member of FIG. 3 with parts broken away for clarity of illustration.

FIG. 1 shows a valve body 10 having a slide chamber 12 comprising a substantially cylindrical bore defined in part by interior wall 13 and an end wall 15. In other embodiments, slide chamber 12 may have any suitable cross-sectional shape, e.g., square, rectangular, oval, triangular, etc., with a correspondingly shaped plug member mounted therein. Obviously, the outside of the valve body may be of any suitable cross-sectional configuration, independent of the cross-sectional configuration of the slide chamber. Each end of valve body 10 has respective purge gas inlets 14, 18 positioned in flow communication with slide chamber 12. The right hand end (as viewed in FIG. 1) of slide chamber 12 is open to receive therein a slidable plug member, as described below, after which the open end of valve body 10 is sealed by any suitable shaft sealing means (FIG. 7) not shown in FIG. 1.

A flow passageway extending radially through valve body 10 is generally indicated at 16 and is provided in part by inlet passageway 16a and outlet passageway 16b, which extend transversely through valve body 10 and intersect slide chamber 12. In the illustrated embodiment of FIG. 1, a pair of blow down connections 20a, 20b are provided. These are used to sweep particulates from the purge gas chambers with a fluid as may be needed in the event of loss of purge gas supply during operation.

As best shown in FIG. 2, substantially cylindrical slide chamber 12 is intersected by inlet and outlet passageways 16a, 16b and has formed along its axial length an opposed pair of grooves 22a and 22b. Only groove 22b is visible in FIG. 1.

Referring now to FIGS. 3 and 4, plug member 24 is of generally cylindrical configuration and has a pair of guide rails 26a, 26b formed on radially opposite sides thereof. Guide rails 26a, 26b, which may be of any suitable configuration, are generally rectangular in cross-section and are configured and dimensioned to be slidably received within, respectively, grooves 22a and 22b to mount plug member 24 for slidable movement within valve body 10. Circular, circumferential grooves 28a and 28b are formed adjacent opposite respective ends of plug member 24 and contain therein, respectively, annular seal rings 30a, 30b. These seal rings may be made of any suitable material, for example, of the same grade of steel as the valve body and plug, and are radially cut to form a gap therein in the same manner as piston rings. This permits the seal rings to be opened for emplacement over grooves 22a, 22b and then compressed to reduce the gap and fit the seal rings within slide chamber 12 in a manner analagous to that in which piston rings are mounted on a piston head within a cylinder. The nearly-closed gaps are shown at g and g' in FIG. 7. For improved clarity of illustration, annular seal ring 30b is omitted from FIG. 3 and rings 30a and 30b are shown partially broken away and/or in cross-section in FIG. 4. Annular seal rings 30a, 30b are preferably made of any suitable heat-resistant, spring-like metal and are dimensioned and configured with a radial gap formed therein so that, upon closure, they bear against the interior wall 13 of slide chamber 12 in sliding, sealing engagement therewith, in the manner of a piston ring bearing against a cylinder wall.

The right hand end, as viewed in FIGS. 3 and 4, of plug member 24 has affixed thereto positioning means comprising a shaft 32 which may be connected to any suitable device, such as a manually or motor driven wheel or other device, for example, a piston operator, adapted to move plug member 24 within slide chamber 12 of valve body 10 so as to position it as desired, as described below. The opposite or left hand end of plug member 24, as viewed in FIGS. 3 and 4, has affixed thereto a pair of stops 34a, 34b (only 34b being visible in FIG. 4). The outer ends of stops 34a, 34b are adapted to contact end wall 15 to set a limit to the leftward (as viewed in FIG. 1) travel distance of plug member 24.

Plug member 24 has a flow orifice 36 extending radially therethrough. In the illustrated embodiment of FIGS. 3–6, inlet segment 36c (FIG. 4) of flow orifice 36 has an ovoid cross-section, as best shown in FIG. 3. That is, inlet segment 36c of flow orifice 36 is roughly egg-shaped in cross-section having a circular-arc base portion 36a, and a tapered slot portion 36b which terminates in an apex 36e. Inlet segment 36c of flow 36 is lined with a hard facing material 40, such as Stellite or any other suitable highly wear-resistant material.

As best seen in FIG. 4, flow orifice 36 comprises inlet segment 36c, which is of ovoid cross-section as described above and outlet segment 36d of expanded cross-section. When plug member 24 is mounted within valve body 10, inlet segment 36c faces inlet passageway 16a, and outlet segment 36d faces outlet passageway 16b. Outlet segment 36d is an expanded opening of stepped configuration defined by its interior walls 38a–38e inclusively, to provide a substantially trapazoidal-shaped, expanded cross-section outlet segment 36d. In the embodiment of FIGS. 3–6, inlet segment 36c of flow orifice 36 has a length (indicated by dimension line L) which is somewhat in excess of one-half of the diameter of plug member 24. However, the length L may be of any suitable dimension which will provide adequate wear-resistance as described in more detail below.

As best shown in FIGS. 3–6, one or more fluidizing gas inlet passages 42a, 42b, and 42c are formed in plug member 24 and extend from one end (the right hand end as viewed in FIGS. 3 and 4) of plug member 24 to outlet segment 36d of flow orifice 36. Another similar set of fluidizing gas inlet passages 44a, 44b, and 44c are formed in the opposite end (left hand end is viewed in FIG. 3) and extend therefrom to outlet segment 36d of flow orifice 36.

FIG. 7 shows plug member 24 mounted for sliding movement within valve body 10, guide rails 26a, 26b being received for sliding movement within, respectively, grooves 22a, 22b. The right hand end (as viewed in FIG. 7) of valve body 10 is closed by an end seal 46 which is attached to valve body 10 by any suitable means, e.g., by a series of bolts 48, and which has a central passage therein (unnumbered) for passage of shaft 32 therethrough. Shaft sealing means 50 provides for a sliding gas-tight seal for shaft 32.

Figure 8C:
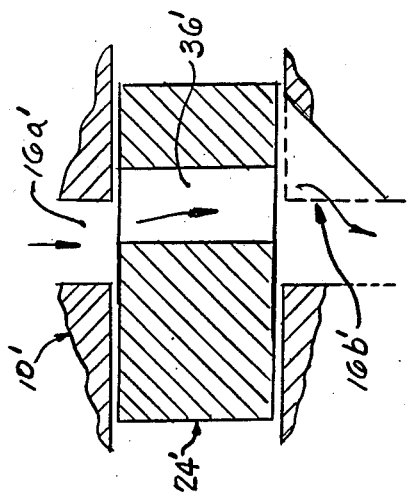
FIG. 8C is a schematic view of a valve generally corresponding to that of FIG. 8A showing another embodiment of the invention.
Figure 8A:
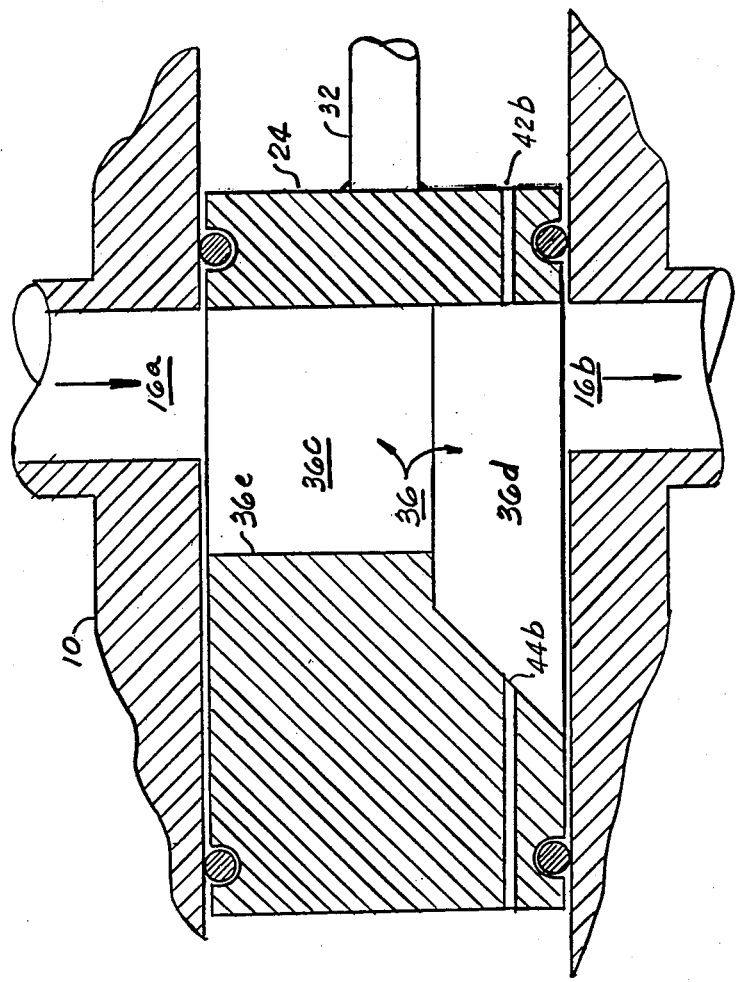
FIG. 8A is a semi-schematic cross-sectional view in elevation taken along the longitudinal axis of the valve of FIG. 7, with parts omitted.

In operation, with plug member 24 slidably mounted within valve body 10 and the right hand end of slide chamber 12 closed by end seal 46, positioning means 32 are moved to position plug member 24 at any selected position along its travel path within valve body 10. In order to fully open the valve, plug member 24 is positioned so that base portion 36a of flow orifice 36 is aligned congruently with inlet passageway 16a of flow passageway 16 whereby plug member 24 does not constrict or impede the flow through flow passageway 36 and the valve is in its fully open position. FIGS. 7A–7C illustrate the relative positions, as would be sensed in a top plan view of the valve assembly of FIG. 7, of plug member 24 and inlet segment 36c of flow orifice 36 thereof to flow passageway 16 (as viewed from inlet passageway 16a, the operations of inlet segment 36c which are shielded from view by valve body 10 are illustrated by dash-line FIGS. 7A-7C). FIGS. 7A and 8A show the fully registered position of flow orifice 36 with inlet passage 16a which provides full-open flow through the valve. The elements of FIG. 8A are numbered to correspond to those of FIGS. 1-7 and so additional description of them is not necessary. In the preferred embodiment illustrated and as best shown in FIGS. 7A and 8A, the inside diameter of inlet passageway 16a is equal to the inside diameter of the circular-arc forming base portion 36a of inlet segment 36c of flow orifice 36. Outlet segment 36d of flow orifice 36 extends leftwardly (as viewed in FIG. 7) beyond inlet segment 36c, so that, at any position of plug member 24, the flow of solids or other material into outlet 16b is not impeded, as described in more detail below.

Figure 8D:
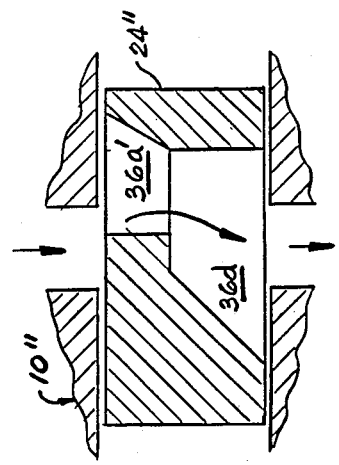
FIG. 8D is a view similar to that of FIG. 8C but on a reduced scale showing yet another embodiment of the invention.
Figure 8B:
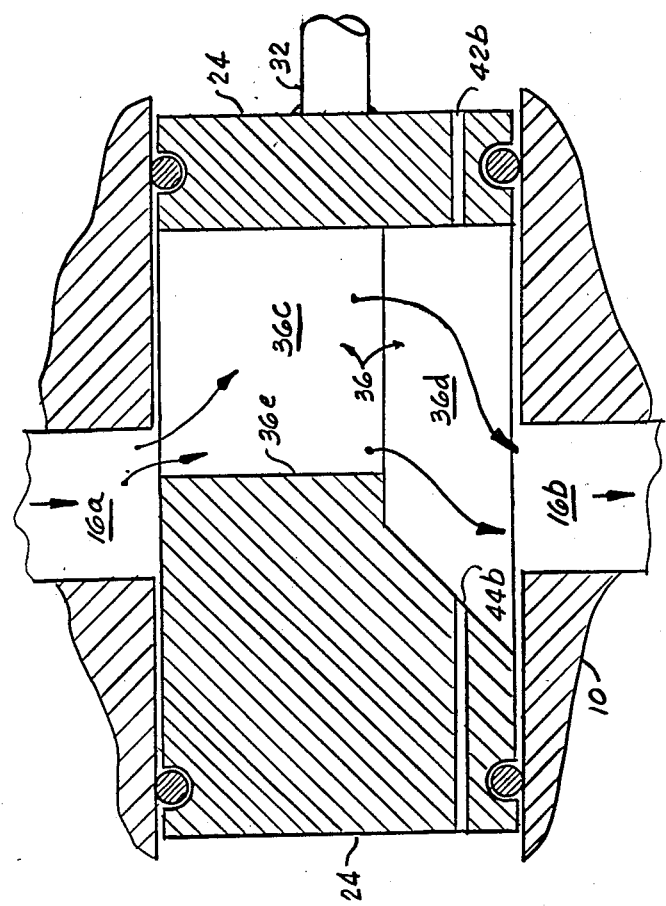
FIG. 8B is a view corresponding to that of FIG. 8A but showing the plug member in a different position within the plug chamber.

When it is desired to reduce the flow through the valve, valve plug 24 is moved a selected distance rightwardly as sensed in FIGS. 1-3, so as to move base portion 36a of orifice 36 partially out of register with inlet passageway 16, whereby a part or all of tapered slot portion 36b of inlet segment 36c of flow orifice 36 is registered with inlet passageway 16a, and thereby constricts the available opening for flow of material through inlet passageway 16a. The relative positions of flow passageway 16 and inlet segment 36c of orifice 36, when the valve is in a throttling position, are illustrated in FIGS. 7B and 8B. This places the valve in a partially open or reduced flow position. As best shown in FIG. 8B, the configuration of outlet segment 36d of flow orifice 36 is seen to be dimensioned and configured to provide a cross-sectional flow area from outlet segment 36d into outlet passage 16b which, at all positions from full open to closed, is as large as, or larger than, the cross-sectional flow area of inlet segment 36c. In the embodiment illustrated in FIG. 8A (and in FIGS. 3, 4, 5, and 6) this feature is obtained by expanding outlet segment 36d leftwardly (as viewed in FIGS. 4 and 8A) to maintain a suitable cross-sectional flow area at all operating positions of plug member 24 within valve body 10. The same effect of avoiding a choke point or bottleneck within flow orifice 36 can be attained with a flow orifice which does not have an outlet segment of expanded cross-section, e.g., a flow orifice of constant cross-section, by utilization of a properly dimensioned and configured outlet passage 16b', as illustrated in FIG. 8C. In FIG. 8C, a valve body 10' has an inlet passage 16a' and an outlet passage 16b', and has a plug member 24' slidably mounted therein. Plug member 24' has a flow orifice 36' of constant cross-sectional area and of any suitable cross-sectional configuration, e.g., ovoid, circular, or the like. Outlet passage 16b' is dimensioned and configured to be expanded rightwardly as viewed in FIG. 8C so that, with the plug member 24' in any operating position, the cross-sectional area for flow from flow orifice 36' into outlet passage 16b' is at least as great as that through flow orifice 36'. Note that if the configuration of flow orifice 36' were used in conjunction with a non-expanded outlet passage, the configuration of which is indicated by the dotted lines in FIG. 8C, the flow path through flow orifice 36' would be "bottlenecked" at the outlet from flow orifice 36' into outlet passage 16b' which could result in the solid particulates clogging flow orifice 36' and plugging the valve.

As plug member 24 is moved further rightwardly relative to valve body 10 (as viewed in FIGS. 1-3, 8A and 8B) the narrower segment of tapered slot 36b of orifice 36 advances across inlet passage 16a, further constricting flow. When apex 36e of tapered slot 36b contacts or clears the right hand (as viewed in FIGS. 1-3, 8A and 8B) portion of inlet passage 16a, the valve is in its fully closed position. The relative positions of inlet passage 16a and inlet segment 36c of orifice 36, when the valve is in its fully closed position, are illustrated in FIG. 7C. It will be appreciated that plug member 24 may be placed in any selected intermediate position thus providing extremely small increments of position between (and including) the full-open position illustrated in FIGS. 7A and 8A and the fully closed or shut-off position illustrated in FIG. 7C.

As the valve of the invention is well adapted to handle abrasive particulate materials, inlet segment 36c of flow orifice 36 is subjected to extensive wear, particularly at and adjacent the apex 36e during partially open/reduced flow operation. Hard facing material 40 helps to resist this wear and prolong the life of the valve but, more significantly, because the length L of the flow orifice inlet segment 36c is large, for example, it may have a length of about 5.1 cm (about 2 inches), a large amount of material may be worn away without affecting the effective flow throttling dimensions or performance of the valve. For example, even if the material wears away to the extent indicated by the dotted wear lines W or W', shown in FIG. 4, the remaining unworn portion U of apex 36e (and the area adjacent the apex) of flow orifice 36 serves to constrict the flow through inlet passage 16a to precisely the same extent as was done prior to any wear being sustained by flow orifice 36. Accordingly, it is seen that a large amount of plug material may be worn away and yet the effective throttling performance and shut-off ability of the valve will remain unchanged simply by moving plug member 24 further to the right for any given setting, by an amount which compensates for the amount of wear.

Before inlet segment 36c of orifice 36 shows appeciable wear, the shut-off position of FIG. 7C may be attained when the right hand end 24r (as viewed in FIG. 7) of plug member 24 is at position $C_n$ (FIG. 1). When inlet segment 36c has sustained wear to the extent shown by wear line W' in FIG. 4, right hand end 24r of plug member 24 will have to be positioned at position $C_w$ (FIG. 1) in order to fully close the valve. The fully-open position of end 24r of plug member 24 is shown at position O in FIG. 1. Any wear sustained by base end 36a of inlet segment 36c of orifice 36 (such wear will be minimal due to the fact that base end 36a is congruent with passageway 16) should not adversely affect the performance of the valve.

Obviously, numerous variations within the scope of the invention may be made to the specific design of the preferred embodiment illustrated in the Figures. For example, in addition to the embodiment illustrated in FIG. 8C, the inlet segment of the flow orifice may be flared as illustrated in FIG. 8D. In this embodiment, outlet segment 36d of the flow orifice is similar to that of the embodiment of FIGS. 3-6, but inlet segment 36a' has a taper converging in the direction of flow therethrough. Fluidizing the particulate solids in the expanded cross-section of outlet segment 36d (FIGS. 4 and 7) helps to ensure smooth passage through the valve and to avoid clogging of the material. Further, the fluidizing gas insures that the bottom of plug member 24, on both sides of outlet segment 36d, will always be moving against a fluidized bed (mass) of solids when the position of plug member 24 is changed, rather than against a packed mass of solids thereby preventing or at least reducing the likelihood of the outlet side of the valve jamming with solids. This is attained by flowing a fluidizing gas through fluidizing gas inlet passages 42a-c and 44a-c across outlet segment 36d of flow orifice 36. In the embodiment illustrated, the fluidizing gas may then pass with purge gas through outlet passageway 16b with the solids. In the embodiment illustrated in the Figures, the fluidizing gas is provided by a portion of the purge gas which is introduced via purge gas inlets 14 and 18. The fluidizing gas portion of the purge gas passes through fluidizing gas inlet passageways 42a-c and 44a-c.

The total length (L plus $l_d$) of flow orifice 36, i.e., the diameter of plug member 24 in the illustrated embodiment, is greater than the diameter of either inlet passageway 16a or outlet passageway 16b. The length L of inlet segment 36c of plug member 24 is of substantial thickness and is preferably at least one-fifth, more preferably at least one-third, of the diameter of inlet passage 16a which, in the embodiment illustrated, is the same as that of outlet passage 16b. In any event, the length L is desirably sufficiently large, for example, about 1.3 to about 5 cm (about 0.5 to about 2 inches or more) to permit a substantial amount of wear of the flow orifice without affecting the effective throttling and shut-off capabilities provided by inlet segment 36c of flow orifice 36.

As used herein, and in the claims, "registration" of the flow orifice with respect to the flow passageway simply means alignment of the flow orifice with respect to the flow passageway. When the flow orifice is stated to be "out of registration" or "not registered" with the flow passageway, it simply means that the flow passageway is entirely closed or blocked by the plug member (as illustrated in FIG. 7C). When the flow orifice is stated to be "registered" or "in registration" with the flow passageway, the flow passageway is either fully open (FIGS. 7A and 8A) or only partially open (FIGS. 7B and 8B). Flow orifice 36, when registered with inlet and outlet segments 16a and 16b, completes and opens flow passageway 16.

The purge gas is introduced via purge gas inlets 14 and 18 under sufficient pressure upstream of annular seal rings 30a and 30b to provide a desired seal ring pressure drop. Slide chamber 12 and plug member 24 and its annular seal rings 30a and 30b are all dimensioned and configured to force purge gas past annular seal rings 30a and 30b to flow along the annular space between plug member 24 and interior walls 13 of slide chamber 12 and out via outlet passage 16b. The purge gas tends to sweep solid particles which might otherwise become trapped in the annular space between plug member 24 and wall 13 of slide chamber 12, thereby tending to wear the valve and cause sticking of plug member 24.

In summary, the above-described valve of the present invention provides significant advantages, including the ability to sustain extensive wear without affecting its flow controlling and shut-off abilities. The expanded cross-section outlet segment of the flow orifice provides an outlet flow area which is equal to or greater than the cross-sectional flow areas of both the inlet passageway (16a in the illustrated embodiments) and the inlet segment (36c in the illustrated embodiments) of the flow orifice at all flow settings, thereby helping to avoid clogging of solids. Further, both full shut-off and all the pressure drop for control of solids flow always take place at the inlet side of the plug member, so that the valve acts as a single-seated valve, not as a double-seated valve in which solids could pack between the dual seats. Further, the flow orifice of the plug member is designed so that, as illustrated in FIGS. 7A and 8A, upon full opening of the valve, the flow passageway is not reduced by the plug member whereby the valve has full line size opening capability.

As mentioned above, the length of the flow orifice (illustrated by the sum of the dimensions L and $l_d$ in FIG. 4), which generally equals the diameter of the plug member, is greater than the diameter of the flow passageway (illustrated by the dimension D in FIG. 1). In preferred embodiments of the invention adapted for the control of particulate solids flow, e.g., the flow of fluidized solid catalyst particles for fluid catalytic cracking of petroleum feedstocks, the length of the flow orifice $(L+l_d)$ is at least about 2 inches (5.1 cm) greater than the inside diameter (D) of the flow passageway. Typically, for a nominal 1.5 inch (3.8 cm) valve, D=1.100 inches (2.79 cm) and $(L+l_d)$=3.162 inches (8.03 cm). For a nominal 3 inch (7.62 cm) valve, D=2.300 inches (5.84 cm) and $(L+l_d)$=4.362 inches (11.08 cm), and for a nominal 6 inch (15.24 cm) valve, D=5.761 inches (14.63 cm) and $(L+l_d)$=7.823 inches (19.87 cm).

The valve or parts thereof may of course be thermally insulated and/or lined or otherwise comprised of a wear- and/or heat-resistant material. For example, external insulation about the valve body may be used to facilitate the plug member and the valve body attaining the same temperature in high temperature service so as to minimize differential thermal expansion.

The valve may be made of any suitable metal of construction, including stainless steel, and may include ceramic or other coatings and components. For example, stainless steel does not have good erosion resistance at high temperatures. Therefore, in one embodiment, a stainless steel valve may be configured so that the inlet and outlet passages of the steel valve body and the flow orifice of the steel plug member are made oversized relative to the rest of the valve and then lined with an appropriate thickness of an erosion-resistant material.

Referring now to FIG. 9, there is shown a valve body 10' comprising an embodiment of the invention in which outlet passage 16b' has an enlarged cross-sectional entry end 216 which is generally wedge-shaped. Entry end 216 is defined by a pair of opposing sloping sidewalls 220, 222, wide longitudinal opening 224 into the slide chamber 212 and a narrow throat 226. Throat 226 leads into the remainder of outlet passage 16b'. Sidewalls 220, 222 define an angle a with longitudinal wall 213 of slide chamber 212. Angle a may vary and may be as large as 60°, say, about 1° to 60°, preferably about 25° to 35°, e.g., 30°, in order to provide a generally V-shaped, funnel-like opening from slide chamber 212 to outlet passage 16b'. A plug member (not shown in FIG. 10) similar to that illustrated in FIGS. 3 and 4 or FIGS. 8A and 8B may be mounted within valve body 10' as described above with respect to other embodiments of the invention. Because of the enlarged configuration of entry end 216, the plug member (not shown) utilized in the FIG. 9 embodiment is relatively longer than those of the other illustrated embodiments so as to enable the plug member to fully bridge enlarged entry end 216 at all operating positions of the valve. Valve body 10' of FIG. 9 is also relatively longer so as to accommodate the longer plug member. The enlarged entry end 216 facilitates the handling of coarser, non-fluidizable or non-fluidized solids. With the valve mounted with the longitudinal axis of slide chamber 212 positioned horizontally, coarse particles will tend to flow by gravity through enlarged entry end 216. For most coarse, non-fluidizable solids, an angle a of about 30°, say 25° to 35°, will be satisfactory. Any suitable design plug member may be used with a valve body having an enlarged entry end of the outlet passage as illustrated in FIG. 10. Although well adapted for handling coarse size particles, e.g., one quarter to one inch diameter particles or larger, the enlarged entry end embodiment is also well suited to handle fine solid particles, whether fluidized or not. Other than the increased thickness of the bottom (as viewed in FIG. 9) of valve body 10', valve body 10' is generally similar to that of valve body 10 of FIG. 1, having an inlet passage 16a' and purge gas inlets 214, 218, with one end of chamber 212 having an end wall 215. Description of other details of valve body 10' are omitted as they are generally similar to those of valve body 10.

Referring now to FIGS. 10A, 10B, and 10C, there is shown another embodiment of the present invention which is similar to that of the FIGS. 1–6 embodiment, except that the plug member 124 is of flat, plate-like construction. Plug member 124 has a flow orifice 136 which is of ovoid construction and extends through the major surfaces of plug member 124. The valve body 110 has an inlet passage 116a and an outlet passage 116b which cooperate to partially define a flow passageway when flow orifice 136 is registered therewith to open the valve to flow therethrough in the direction indicated by the arrow F in FIG. 10A.

Plug member 124 is mounted for movement within a slide chamber (unnumbered) formed within valve body 110 and has positioning means comprising a shaft 132 attached thereto to selectively adjust the position of plug member 124 within valve body 110.

As best seen in FIG. 10B, orifice 136 comprises a circular-arc base portion 136a and a tapered slot portion 136b which terminate in an apex 136e. Inlet and outlet conduits 116a and 116b are coaxially aligned and of circular cross-section.

The dotted line circles O, P, and C in FIG. 10B show the relative positions of inlet flow passageway 116a and flow orifice 136. In the illustrated embodiment, inlet flow passageway 116a is identically configured to outlet flow passageway 116b but the latter can, of course, be larger. When plug member 124 is positioned to fully align flow passageway 116a with flow orifice 136 as illustrated by dotted line circle O, the valve is fully open and provides the capability of full line opening flow therethrough. When plug member 124 is positioned so that the relative position of flow passageway 116 to flow orifice 136 is shown by dotted line circle P, the valve is partially open. Similarly, with plug member 124 positioned so that the relative position of flow passageway 116a to flow orifice 136 is shown by dotted line circle C, the valve is fully closed. As described above with respect to the embodiment of FIGS. 1–6, plug member 124 may be moved in extremely small increments to provide any desired intermediate setting from and including full open, partially open, and full closed. Details of construction of the valve of FIGS. 10A–10C, such as a stop to limit leftward (as viewed in FIG. 10A) movement, etc., are omitted as such may generally be similar to those described in detail with respect to the FIGS. 1–6 embodiment.

While the invention has been described with respect to a specific preferred embodiment thereof, it will be appreciated that upon a reading and an understanding of the foregoing, variations thereto may well occur to those skilled in the art and it is intended to include all variations within the scope of the following claims.

What is claimed is:

1. An improved valve comprising:
   a valve body having a slide chamber therein and an inlet passage and an outlet passage cooperating to partially define a flow passageway transversely intersecting the slide chamber:
   a plug member mounted for sliding movement within the slide chamber, the plug member being effective to seal the flow passageway as defined below and having a flow orifice extending transversely therethrough, the flow orifice comprising an inlet segment facing the inlet passage and an outlet segment facing the outlet passage, the plug member and its flow orifice being each dimensioned and configured to seal the flow passageway when the flow orifice is out of registration with the inlet passage and to complete the flow passageway by connecting the inlet and outlet passages in flow communication when the flow orifice is registered therewith, the cross-sectional area of the outlet segment of the flow orifice being sufficiently greater than the cross-sectional area of the entry to the outlet passage whereby, at all operating positions of the plug member within the slide chamber, the outlet passage is unconstricted by the plug member; and
   positioning means operatively connected to the plug member to position the plug member at selected incremental locations within the slide chamber to selectively adjust registration of the flow orifice with the inlet and outlet passages at fully open, fully closed and a plurality of intermediate throttling positions.

2. The valve of claim 1 wherein the inlet and outlet passages are respectively located at radially opposite sides of the slide chamber.

3. The valve of claim 1 wherein the cross-sectional area of the flow orifice outlet segment is greater than the cross-sectional area of the flow orifice inlet segment.

4. The valve of claim 1 wherein the inlet passage and the outlet passage are coaxial.

5. The valve of claim 1 wherein the length of the flow path through the flow orifice is larger than the diameter of the inlet passage.

6. The valve of claim 1 wherein the length of the flow path of the inlet segment of the flow orifice is at least one-fifth of the diameter of the inlet passage and the plug member is so dimensioned and configured that wear of the inlet segment of the flow orifice may be accommodated by changes in the position of the plug member relative to the valve body for a given valve setting.

7. The valve of claim 1 wherein the length of the flow path of the inlet segment of the flow orifice is at least one-third of the diameter of the inlet passage.

8. An improved valve comprising:
   a valve body having a slide chamber therein and an inlet passage of circular cross-section and an outlet passage of circular cross-section cooperating to partially define a flow passageway transversely intersecting the slide chamber;

a plug member mounted for sliding movement within the slide chamber, the plug member being effective to seal the flow passageway as defined below and having a flow orifice extending transversely therethrough, the flow orifice comprising an inlet segment of ovoid cross-section facing the inlet passage and an outlet segment facing the outlet passage, the inlet segment of the flow orifice having a base portion with a cross-sectional flow area at least as large as that of the inlet passage and a tapered slot portion with a cross-sectional flow area less than that of the inlet passage, the plug member and its flow orifice being each dimensioned and configured to seal the flow passageway when the flow orifice is out of registration with the inlet passage and to complete the flow passageway by connecting the inlet and outlet passages in flow communication when the flow orifice is registered therewith, the cross-sectional area of the outlet segment of the flow orifice being sufficiently greater than the cross-sectional area of the entry to the outlet passage whereby, at all operating positions of the plug member within the slide chamber, the outlet passage is unconstricted by the plug member; and positioning means operatively connected to the plug member to position the plug member at selected incremental locations within the slide chamber to selectively adjust registration of the flow orifice with the inlet and outlet passages at fully open, fully closed and a plurality of intermediate throttling positions.

9. The valve of claim 8 wherein the base portion of the ovoid cross-section of the flow orifice comprises an arc of a circle of a diameter at least as great as the diameter of the inlet passage and the tapered slot portion of the ovoid cross-section is narrower than the diameter of the inlet passage whereby, when the base portion is fully registered with the inlet passage, the valve is fully open to flow therethrough and, when the slot portion or part thereof is registered with the inlet passage, the valve is partially open for flow therethrough.

10. The valve of claim 9 wherein the base portion of the ovoid cross-section of the flow orifice is dimensioned and configured to be congruent with an arc of the cross-section of the inlet passage.

11. The valve of claim 1 wherein at least a portion of the flow orifice adjacent the inlet passage comprises a wear-resistant material.

12. The valve of claim 1 wherein the slide chamber comprises a generally cylindrical bore and the plug member is of generally cylindrical configuration.

13. The valve of claim 1 wherein there exists an annular clearance between the plug member and the slide chamber and further including purge gas means to flow a purge gas through the annular clearance.

14. The valve of claim 13 wherein the purge gas means comprises purge gas inlet means in the valve body, the plug member carries a pair of axially spaced-apart annular seal members bearing against the interior wall of the slide chamber, and the purge gas inlet means are disposed so as to be axially outward of the annular seal members regardless of the position of the plug member within the slide chamber.

15. An improved valve comprising:
a valve body having a slide chamber therein and an inlet passage and an outlet passage cooperating to partially define a flow passageway transversely intersecting the slide chamber;

a plug member mounted for sliding movement within the slide chamber, the plug member being effective to seal the flow passageway as defined below and having a flow orifice extending transversely therethrough, the flow orifice comprising an inlet segment facing the inlet passage and an outlet segment facing the outlet passage, the plug member and its flow orifice being each dimensioned and configured to seal the flow passageway when the flow orifice is out of registration with the inlet passage and to complete the flow passageway by connecting the inlet and outlet passages in flow communication when the flow orifice is registered therewith, the cross-sectional area of the outlet segment of the flow orifice being sufficiently greater than the cross-sectional area of the entry to the outlet passage whereby, at all operating positions of the plug member within the slide chamber, the outlet passage is unconstricted by the plug member;

positioning means operatively connected to the plug member to position the plug member at selected incremental locations within the slide chamber to selectively adjust registration of the flow orifice with the inlet and outlet passages at fully open, fully closed and a plurality of intermediate throttling positions; and fluidizing gas flow means to flow a gas through the outlet segment of the flow orifice.

16. The valve of claim 15 wherein the fluidizing gas flow means comprises fluidizing gas inlet passages extending, respectively, from opposite ends of the plug member to the outlet segment of the flow orifice.

17. The valve of claim 16 wherein the fluidizing gas flow inlet passages are arranged to flow the fluidizing gas across the outlet segment of the flow orifice.

18. An improved valve comprising:
a valve body having therein a slide chamber comprising a substantially cylindrically shaped bore and an inlet passage and an outlet passage at respective radially opposite sides of the chamber, the inlet and outlet passages cooperating to partially define a flow passageway transversely intersecting the slide chamber;

a substantially cylindrical shaped plug member mounted for sliding movement within the slide chamber, the plug member being effective to seal the flow passageway as defined below and having a flow orifice extending transversely therethrough, the plug member and its flow orifice being each dimensioned and configured to seal the flow passageway when the flow orifice is out of register with the inlet passage and to complete the flow passageway by connecting the inlet and outlet passages in flow communication when the flow orifice is registered therewith, the flow orifice comprising an inlet segment facing the inlet passage of the flow passageway and an outlet segment facing the outlet passage of the flow passageway, the outlet segment having a cross-sectional area greater than that of the inlet segment and sufficiently greater than the cross-sectional area of the entry to the outlet passage whereby, at all operating positions of the plug member within the slide chamber, the outlet passage is unconstricted by the plug member; and positioning means operatively connected to the plug member to position the plug member at selected incremental locations within the slide chamber to selectively adjust registration of the flow orifice with the flow passageway at fully open, fully closed and a plurality of intermediate throttling positions.

19. An improved valve comprising:
(a) a valve body having therein a slide chamber comprising a substantially cylindrically shaped bore and an inlet passage and an outlet passage at respective radially opposite sides of the chamber, the inlet and outlet passages each being of circular cross-section and cooperating to partially define a flow passageway transversely intersecting the slide chamber;
(b) a substantially cylindrical shaped plug member mounted for sliding movement within the slide chamber, the plug member being effective to seal the flow passageway as defined below and having a flow orifice extending transversely therethrough, the plug member and its flow orifice being each dimensioned and configured to seal the flow passageway when the flow orifice is out of register with the inlet passage and to complete the flow passageway by connecting the inlet and outlet passages in flow communication when the flow orifice is registered therewith, the flow orifice comprising an inlet segment facing the inlet passage of the flow passageway and an outlet segment facing the outlet passage of the flow passageway, (i) the inlet segment of the flow orifice being of ovoid cross-section including a circular-arc base portion and a tapered slot portion, and wherein the base portion is congruent with a segment of the cross-section of the inlet segment and the slot portion is narrower than the diameter of the inlet segment whereby, when the base portion is fully registered with the inlet segment, the valve is fully open for flow therethrough and, when the slot portion or part thereof is registered with the inlet segment, the valve is partially open for flow therethrough, and (ii), the outlet segment of the flow orifice having a cross-sectional area grreater than that of the inlet segment and sufficiently greater than the cross-sectional area of the entry to the outlet passage whereby, at all operating positions of the plug member within the slide chamber, the outlet passage is unconstricted by the plug member; and
(c) positioning means operatively connected to the plug member to position the plug member at selected incremental locations within the slide chamber to selectively adjust registration of the flow orifice with the flow passageway at fully open, fully closed and a plurality of intermediate throttling positions.

20. The valve of claim 18 wherein the axial length of the inlet segment is at least one-fifth of the diameter of the inlet passage.

* * * * *